United States Patent [19]

Shikama et al.

[11] Patent Number: 4,625,303
[45] Date of Patent: Nov. 25, 1986

[54] AUTOMATIC FOCUSING DEVICE

[75] Inventors: Shinsuke Shikama; Mitsushige Kondou; Nobumasa Egashira; Kazuo Okada, all of Kyoto, Japan

[73] Assignee: Mitsubishi Denki Kabushiki Kaisha, Tokyo, Japan

[21] Appl. No.: 647,124

[22] Filed: Sep. 4, 1984

[30] Foreign Application Priority Data

Sep. 5, 1983 [JP] Japan .................... 58-162823

[51] Int. Cl.$^4$ .................................... G11B 7/00
[52] U.S. Cl. ............................ 369/45; 369/46; 369/120
[58] Field of Search ............ 250/201 DF, 202; 369/44, 45, 46, 120

[56] References Cited

U.S. PATENT DOCUMENTS

| | | |
|---|---|---|
| 4,023,033 | 5/1977 | Bricot et al. |
| 4,051,527 | 9/1977 | Braat ................ 369/46 |
| 4,410,969 | 10/1983 | Maeda ................ 369/46 |
| 4,414,658 | 11/1983 | Yoshida .............. 369/46 |

FOREIGN PATENT DOCUMENTS 55-87328 7/1980 Japan .
1532345 8/1976 United Kingdom .

Primary Examiner—Donald McElheny, Jr.
Attorney, Agent, or Firm—Bernard, Rothwell & Brown

[57] ABSTRACT

An automatic focusing device for controlling the position of the objective lens relative to the information recording medium is provided with an astigmatic optical system which receives the reflected light beam reflected by the information recording medium. The light receiving surface of a light detector included in the astigmatic optical system consists of a central light receiving section formed approximatley symmetrically with respect to two axes intersecting each other perpendicularly and having a constricted central portion, and two side light receiving sections formed approximately symmetrically with respect to those two axes and opposite to each other. The light reception signal given by the central light receiving section and the light reception signals given by the side light receiving sections are fed to a focal position detecting circuit which gives a signal corresponding to the deviation of the objective lens from the focused position, on the basis of the light reception signals given thereto.

6 Claims, 6 Drawing Figures

AUTOMATIC FOCUSING DEVICE

BACKGROUND OF THE INVENTION

1. Field of the Invention

The present invention relates to an automatic focusing device of an optical head for reading information or writing information in an information recording medium such as a digital audio disk or a video disk and more particularly to an automatic focusing device employing an astigmatic optical system.

2. Description of the Prior Art

Recently, active development of optical video disk devices and optical audio disks for reproducing information recorded optically in information recording disks or for recording information in information recording disks by the use of a head using a laser light has been made. The head of such an optical disk device (referred to as "optical disk head" hereinafter) is designed to focus a condensed laser light correctly on the information recording track of a disk serving as an information recording medium. Accordingly, the optical disk head needs to be equipped with an automatic focusing device. There is a known system employing an astigmatic optical system for information detection and for focal position detection.

FIG. 1 is a schematic light passage diagram of an automatic focusing device of an optical disk head employing an astigmatic optical system, FIG. 2 is a perspective view of part of the light passage of FIG. 1 and FIG. 3 is a circuit diagram of a servo mechanism including a light detector and the following circuits. Referring to FIGS. 1, 2 and 3, there are shown a light source 1 such as a semiconductor laser, a light beam 2 emitted by the light source 1, an objective lens 3, an optical disk serving as an information recording medium, storing digital audio signals or video signals in tracks and placed in the vicinity of the focal point of the objective lens, a reflected light beam 5 reflected from a focal spot on the disk 4 and transmitted through the objective lens 3, a beam splitter 6 for separating the radiated light beam 2 and the reflected light beam 5, a cylindrical lens 7 serving as an optical element for causing the astigmatic aberration of the reflected light beam 5 and having a longitudinal axis x extending perpendicularly to the surface of the sheet and an axis y extending perpendicularly to the axis x. One of the axes x and y is arranged substantially in the track direction on the disk. A light detector 8 is divided into four sections 8a, 8b, 8c and 8d by division lines extending at an angle of 45° with respect to the x-direction and y-direction respectively, a reflection beam spot 9 formed in the light detector 8 by the reflected light beam 5, a focal point detecting circuit 10 consisting of adders 11 and 12 and a differential amplifier 13, an information detecting circuit 14 formed of an adder, a focus actuator 15 for moving the objective lens along the optical axis, a lens driving circuit 16 which energizes the focus actuator 15 to drive the objective lens, and an information reproducing circuit 17, not shown.

The functions of the automatic focusing device will be described hereinafter. A laser beam 2 emitted by the light source 1 is focused by the objective lens 3 and forms a light spot on a track of the disk 4. The disk 4 has an irregular surface formed of minute pits. Information is formed in the form of those pits. As the disk 4 is rotated, the laser beam radiated on the surface of the disk 4 is modulated by the pits and is reflected.

The reflected light beam 5 is separated from the laser beam 2 by the beam splitter 6 and is converted into an astigmatic beam which is converged in a single direction, by the cylindrical lens 7. The cylindrical lens 7 does not have the function of lens in the x-direction, therefore, the reflected beam is focused on a point P by the objective lens 3, while in the y-direction, the reflected beam is focused on a point Q by the focusing function of the cylindrical lens 7. Accordingly, the form of light distribution of the astigmatic reflected beam at the point Q, at the point P and at an intermediate point V between the points P and Q is an ellipse elongated in the x-direction, an ellipse elongated in the y-direction and an ellipse elongated either in the x-direction or in the y-direction or a circle, respectively.

The four-section light detector 8 is located at a position where the form of the light distribution of the astigmatic reflected beam is a circle, namely, the intermediate position V, when the disk 4 is positioned at a position corresponding to the focal point of the objective lens 3 (this position will be referred to as "focused position" hereinafter). Accordingly, the form of the spot 9 of the reflected beam on the light detector 8 is a circle when the disk 4 is at the focused position, an ellipse elongated in the x-direction when the disk 4 is at a position displaced toward the objective lens 3 from the focused position and an ellipse elongated in the y-direction when the disk 4 is displaced from the focused position away from the objective lens 3.

When the spot 9 of the reflected beam is circular, the light receiving sections 8a, 8b, 8c and 8d receive light equally. When the spot 9 of the reflected light is an ellipse elongated in the x-direction, the light receiving sections 8a and 8c receive more light than the rest of the light receiving sections. When the spot 9 of the reflected beam is an ellipse elongated in the y-direction, the light receiving sections 8b and 8d receive more light than the rest of the light receiving sections.

Accordingly, the output signal of the differential amplifier 13, i.e., the output signal $E_f$ of the focal position detecting circuit 10, corresponding to the difference between the output signal given by the adder 11 corresponding to the sum of the light reception outputs of the light receiving sections 8a and 8c and the output signal given by the adder 12 corresponding to the sum of the light reception outputs of the light receiving sections 8b and 8d is zero when the disk 4 is at the focused position, a positive value when the objective lens 3 is moved toward the optical disk 4 from the focused position and the spot 9 of the reflected beam is an ellipse elongated in the x-direction, and a negative value when the objective lens 3 is moved from the focused position away from the optical disk 4 and the spot 9 is an ellipse elongated in the y-direction. The magnitude of the output signal of the focal position detecting circuit is approximately proportional to the deviation of the objective lens 3 from the focused position. Accordingly, the objective lens 3 is focused automatically by energizing the focus actuator 15 through the control of the lens driving circuit 16 by the output signal $E_f$ of the focal position detecting circuit 10 to move the objective lens 3 along the optical axis.

The information read out from the optical disk 4 and carried by the reflected beam 5 is taken out by an information detecting circuit 14 which receives the sum of the light reception output signals of the light receiving sections.

However, the conventional automatic focusing device as described hereinbefore has the following problems in its practical use. As shown more specifically in FIG. 4A showing the detail of the constitution of the four-section light detector 8 of FIG. 3, there is a blind zone 18 of a finite width between the light receiving sections 8a, 8b, 8c and 8d to separate those light receiving sections from each other. If the width of this blind zone 18 is too narrow, cross talk between those light receiving sections increases and the output signal corresponding to the calculated difference is reduced adversely. According to exemplary design data of the conventional automatic focusing device, the diameter of the spot 9 when the objective lens is at the focused position is about 100 $\mu$m and the lower limit of the width of the blind zone is approximately 10 to 15 $\mu$m. Furthermore, the energy of a portion of the flux of the incident light on the light detector 8 that falls on the blind zone 18 does not contribute at all either to the output of the focal position detecting circuit 10 or to the output of the information detecting circuit 14.

On the other hand, since the reflected beam 5 is a Gaussian beam as shown in FIG. 4B and the center O of the reflected beam 5, where the flux density of the reflected beam 5 is the highest, coincides with the central portion of the light detector 8 where the blind zone is extending, the focused state detecting sensitivity is relatively low as compared with the sensitivity of detection in an ideal condition where the width of the blind zone is zero and cross talk does not occur. Still further, the loss of the incident energy due to the presence of the blind zone causes the reduction in the output of the information detecting circuit 14, which entails the deterioration of the SN ratio.

SUMMARY OF THE INVENTION

It is an object of the present invention to provide a highly reliable automatic focusing device having a satisfactory focal position detecting sensitivity, through the reduction of the number of the component parts and the manufacturing cost and the prevention of the deterioration of the dielectric strength of separating zone of the light detector.

An automatic focusing device according to the present invention has an astigmatic optical system including an optical element which causes the astigmatic aberration of the reflected light beam reflected by an optical disk serving as an information recording medium, transmitted through an objective lens, and then separated with a beam splitter from the light beam emitted by a light source, and a light detector disposed in the light passage of the optical element.

The light receiving surface of the light detector consists of three light receiving sections, namely, a central light receiving section formed symmetrically with respect to an axis extending in parallel to the axial direction of the optical element and to an axis extending perpendicularly to the axial direction of the optical element, and having a constricted central portion, and two side light receiving sections formed symmetrically with respect to those two axes perpendicular to each other and arranged with the respective apexes thereof opposed.

The automatic focusing device is provided with a focal position detecting circuit which gives a differential output signal corresponding to the difference between the light reception output signal given by the central light receiving section and the sum of the light reception output signals of the side light receiving sections to actuate a lens driving circuit so that the objective lens is moved for automatic focusing until the differential output signal becomes zero.

DETAILED DESCRIPTION OF THE PREFERRED EMBODIMENT

Figure 5:
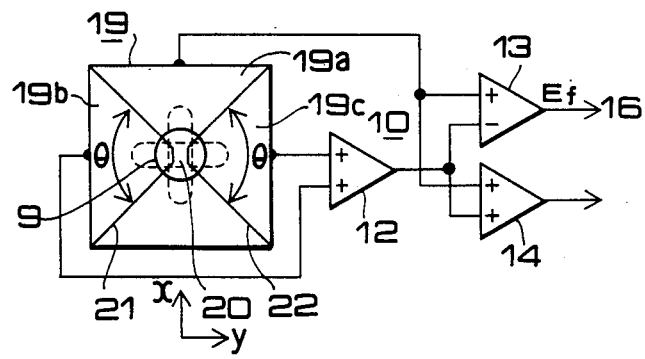
FIG. 5 is an explanatory view showing the constitution and the circuit of a light detector employed in an automatic focusing device embodying, in a preferred embodiment, the present invention.

A preferred embodiment of the present invention will be described hereinafter in connection with the accompanying drawings. FIG. 5 is a schematic view showing the constitution and the circuit of a light detector employed in the first embodiment of an automatic focusing device according to the present invention. Other parts and the constitution of the automatic focusing device are the same as those of the automatic focusing device of FIGS. 1 to 3. Like reference characters designate like or corresponding parts through FIGS. 3 and 5. A focal position detecting circuit 10 consists only of an adder 12 and a differential amplifier 13. A light detector 19 is divided, by division lines 21 and 22 which are bent in the central portion of the light detector 19, into three light receiving sections, namely, a central light receiving section 19a with a constricted central portion and side light receiving sections 19b and 19c which are formed opposite to each other on the opposite sides of the central light receiving section 19a. The shape of the central light receiving section 19a is axially symmetric with respect to both an axis extending in an x-direction and an axis extending in a y-direction which intersect perpendicularly each other at the center of the light detector 19. The form of each of the side light receiving sections 19b and 19c is axially symmetric with respect to the axis extending in the y-direction.

Figure 1:
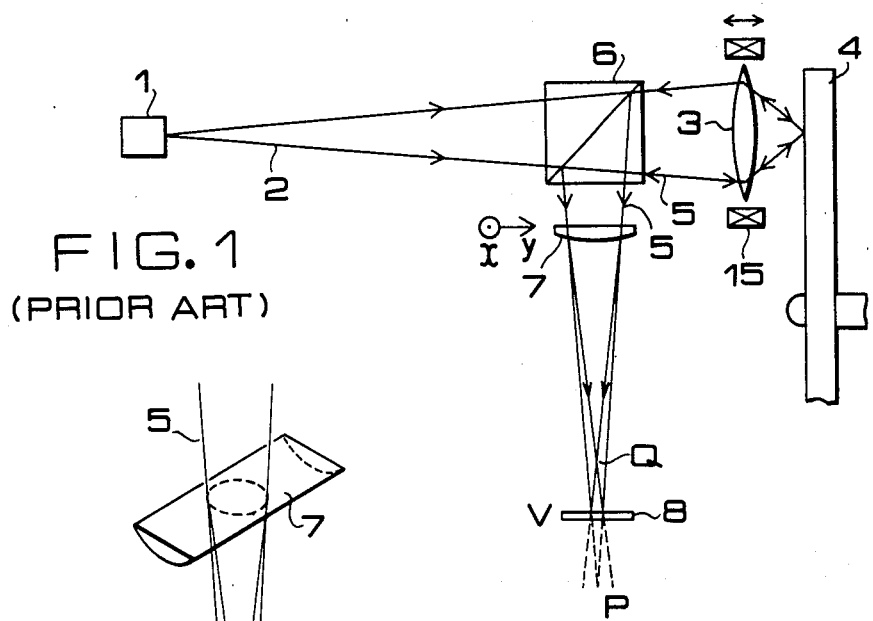
FIG. 1 is a schematic view showing the light passage of an automatic focusing device for an optical disk head, employing a conventional astigmatic optical system.
Figure 2:
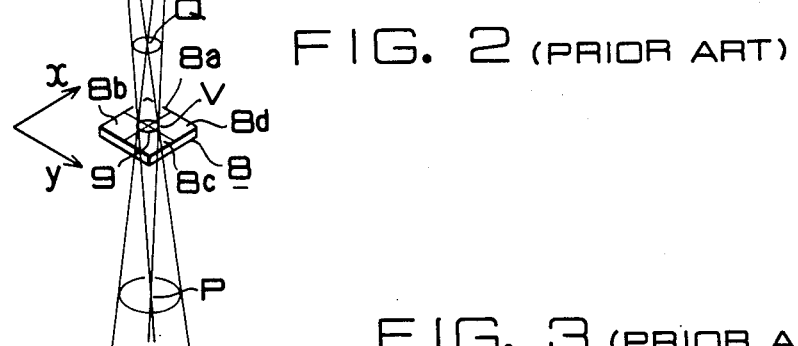
FIG. 2 is a schematic perspective view showing the light passage of the astigmatic optical system of FIG. 1.
Figure 3:
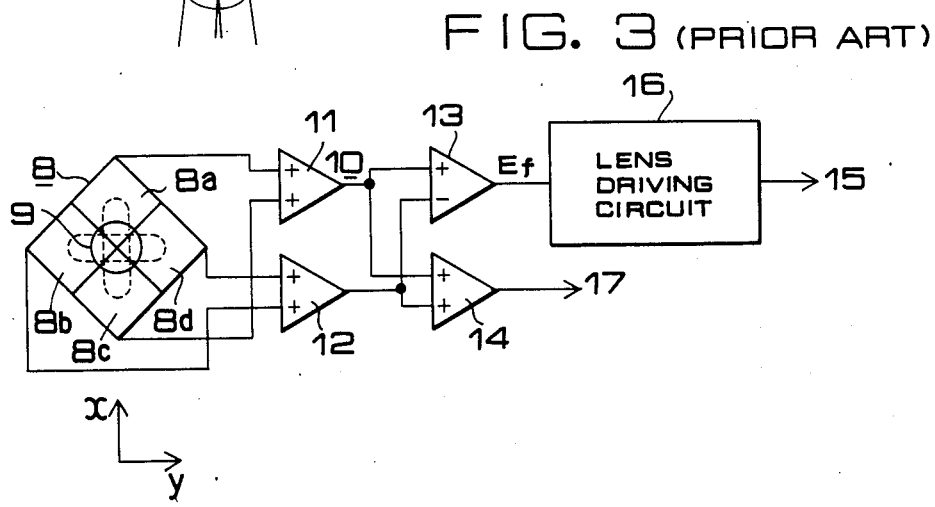
FIG. 3 is an explanatory view showing the constitution and the circuit of a light detector employed in the astigmatic optical system of FIG. 1.
Figure 4A:
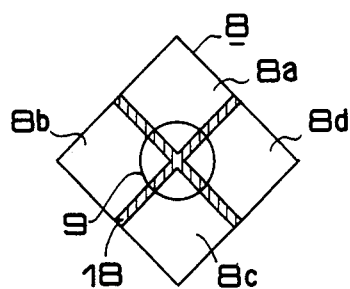
FIGS. 4A and 4B are a view showing a mode of division of the light detector of FIG. 3 and a diagram showing a characteristic laser flux distribution curve respectively.
Figure 4B:
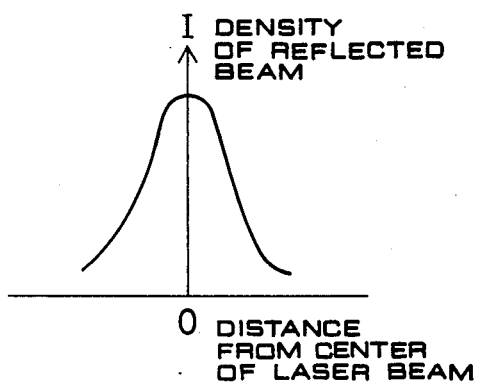

Basically, the focal position detecting function and the automatic focusing function of the automatic focusing device employing this light detector 19 are the same as those of the conventional automatic focusing device as shown in FIGS. 1 to 3.

However the automatic focusing device of the present invention has advantages over the conventional automatic focusing device. In the light detector 8 employed in the conventional automatic focusing device, the light receiving sections 8a and 8c are interconnected by the external adder 11, whereas, in the light detector 19 employed in the automatic focusing device of the present invention, the light receiving section corresponding to the light receiving sections 8a and 8c are interconnected internally by a connecting part 20 to form a single light receiving section 19a, and hence the adder 11 is unnecessary.

Furthermore, in the light detector 19, the connecting part 20 is provided instead of division lines in the central portion of the light detector, where the flux density of the spot of the reflected beam is the highest and the division line affects greatly the light energy loss, to receive the light flux of the central portion of the light spot efficiently. Therefore, the focus deviation detecting sensitivity is increased. Still further, the effective use of the light flux in the central portion of the light detector enables an information detecting circuit 14 to give a reproduction signal of increased amplitude level, which contributes to the improvement of the SN ratio. The present invention enables, in addition to those improvements, the reduction of components, such as the adder 11, and the improvement of reliability without deteriorating the performance of the automatic focusing device, and thereby the reduction of the manufacturing cost. Furthermore, since the edge angle of the opposed apexes of the side light receiving sections 19b and 19c can be increased, the deterioration of the dielectric strength due to the concentration of electric field on the apexes is prevented.

Although each angle $\theta$, $\theta'$ of the bent division lines 21 and 22 of the light detector 19 shown in FIG. 5 employed in the embodiment described hereinbefore is an angle of 90° therebetween, the angle is not necessarily be 90°. The angle, for example, may be an angle slightly greater than 90° in order to compensate the unbalance between the input signals given to the differential amplifier attributable to the presence of the connecting part 20.

As described hereinbefore, according to the present invention, the employment of the three-section light detector reduces the reduction of the received light energy attributable to the blind zone formed of the division lines. Consequently, the focus deviation detecting sensitivity is enhanced, the SN ratio of the information detecting circuit is improved, the number of the component parts is reduced, the reliability of the device is improved, the manufacturing cost of the device is reduced and the deterioration of the dielectric strength of separating zone of the light detector is prevented.

What is claimed is:

1. An automatic focusing device for an optical disk head, comprising:
   an objective lens for focusing the light beam emitted from a light source on the track of an information recording medium;
   a beam splitter capable of separating the light beam emitted from the light source and the reflected light beam reflected by the information recording medium at the focal spot thereon and transmitted through the objective lens from each other;
   an astigmatic optical system including an optical element capable of causing the astigmatic aberration of the reflected light beam separated from the light beam emitted from the light source;
   a light detector having a light receiving surface divided, by two division lines which are bent in the vicinity of the center of the light receiving surface, into a central light receiving section formed symmetrically with respect to an x-axis extending through the center in parallel to the axis of the optical element and with respect to a y-axis extending perpendicularly to the x-axis and having a constricted central portion, and two side light receiving sections formed symmetrically with respect to both the x-axis and the y-axis and arranged with the respective apexes thereof opposed, and adapted to receive the reflected light beam through the optical element and to give a detection output signal corresponding to the variable shape of the spot of the reflected light beam formed on the light receiving surface thereof;
   a focal position detecting circuit capable of giving a signal corresponding to the deviation of the information recording medium from the focal point of the objective lens, on the basis of the detection output signal given by the light detector; and
   a lens driving circuit adapted to drive the objective lens along the optical axis on the basis of the output signal given by the focal position detecting circuit.

2. An automatic focusing device according to claim 1, wherein said focal position detecting circuit comprises:
   an adder which adds the light reception output signals given by said two side light receiving sections; and
   a differential amplifier which gives a differential output signal corresponding to the difference between the light reception output signal of the central light receiving section of said light detector and the output signal of said adder.

3. An automatic focusing device according to claim 1, wherein an adder to add the light reception output signals of the side light receiving sections of said light detector and an information detecting circuit to add the light reception output signal given by the central light receiving section of said light detector and the output signal of said adder are provided.

4. An automatic focusing device according to claim 1, wherein the angles $\theta$, $\theta'$ of the bent division lines of said light detector are 90°, respectively.

5. An automatic focusing device according to claim 1, wherein the angles $\theta$, $\theta'$ of the bent division lines of said light detector are an angle greater than 90°, respectively.

6. An automatic focusing device for an optical disk head, comprising:
   an objective lens for focusing the light beam emitted from a light source on the track of an information recording medium:
   a beam splitter capable of separating the light beam emitted from the light source and the reflected light beam reflected by the information recording medium at the focal spot thereon and transmitted through the objective lens from each other;
   an optical element capable of causing the astigmatic aberration of the reflected light beam separated from the light beam emitted from the light source;
   a light detector having a light receiving surface divided, by two division lines which are bent in the vicinity of the center of the light receiving surface, into a central light receiving section formed approximately symmetrically with respect to an x-axis extending through the center in parallel to the axis of the optical element and with respect to a y-axis extending perpendicularly to the x-axis and having a constricted central portion, and two side light receiving sections formed symmetrically with respect to both the x-axis and the y-axis and arranged with the respective apexes thereof opposed, and adapted to receive the reflected light beam through the optical element and to give a detection output signal corresponding to the variable shape of the spot of the reflected light beam formed on the light receiving surface thereof;

a focal position detecting circuit capable of giving a signal corresponding to the deviation of said information recording medium from the focal point of the objective lens, on the basis of the difference between the light reception signal given by the central light receiving section and the light reception signals given by the side light receiving sections;

a lens driving circuit adapted to drive the objective lens along the optical axis on the basis of the output signal given by the focal position detecting circuit; and an information detecting circuit which reads the information recorded in the information recording medium, on the basis of the sum of the light reception output signal given by the central light receiving section of said light detector and the light reception signals given by the side light receiving sections of said light detector.

* * * * *